United States Patent

Rimmer

(10) Patent No.: US 6,585,416 B1
(45) Date of Patent: Jul. 1, 2003

(54) SELF-ALIGNING SHAFT SUPPORT

(75) Inventor: Ian Rimmer, Woodvale (AU)

(73) Assignee: Harbison-Fischer, Inc., Crowley, TX (US)

( * ) Notice: Subject to any disclaimer, the term of this patent is extended or adjusted under 35 U.S.C. 154(b) by 0 days.

(21) Appl. No.: 09/936,577

(22) PCT Filed: Mar. 10, 2000

(86) PCT No.: PCT/AU00/00176

§ 371 (c)(1), (2), (4) Date: Dec. 21, 2001

(87) PCT Pub. No.: WO00/53959

PCT Pub. Date: Sep. 14, 2000

(30) Foreign Application Priority Data

Mar. 10, 1999 (AU) .............................................. PP 9088

(51) Int. Cl.⁷ .............................. F16C 31/02; F16J 15/06
(52) U.S. Cl. .......................... 384/16; 277/503; 277/507
(58) Field of Search ..................... 384/16, 38, 206, 384/208, 209, 211, 212; 277/503, 505, 506, 507, 511

(56) References Cited

U.S. PATENT DOCUMENTS

| 1,902,360 A | 3/1933 | Foster |
| 1,911,670 A | 5/1933 | Black |
| 1,947,198 A | 2/1934 | Goble |
| 2,235,289 A | 3/1941 | Dunn et al. |
| 2,267,183 A | 12/1941 | Williams |
| 2,592,566 A | 8/1952 | Heim |
| 2,628,112 A | 2/1953 | Hebard |
| 2,832,650 A | 4/1958 | Park |
| 3,626,770 A | 12/1971 | Lindberg et al. |
| 3,887,196 A | 6/1975 | Renfrow |
| 4,360,186 A | 11/1982 | Tinsley et al. |
| 4,483,569 A | 11/1984 | Smith |
| 4,579,350 A * | 4/1986 | Knox .......................... 277/322 |
| 4,729,145 A | 3/1988 | Egner-Walter et al. |
| 4,773,112 A | 9/1988 | Egner-Walter et al. |
| 4,832,161 A | 5/1989 | Weiler et al. |
| 4,993,739 A | 2/1991 | Putnam |
| 5,112,140 A | 5/1992 | Cherny et al. |
| 5,590,966 A | 1/1997 | Cherny et al. |
| 5,636,849 A * | 6/1997 | Jonsson et al. .............. 384/192 |
| 5,878,812 A | 3/1999 | Heinonen et al. |

FOREIGN PATENT DOCUMENTS

| AU | 625322 | 11/1989 |
| AU | 674209 | 3/1994 |
| DE | 3520180 | 3/1986 |
| GB | 846905 | 8/1960 |
| SU | 881448 | 11/1981 |
| WO | 94/21944 | 9/1994 |

OTHER PUBLICATIONS

Derwent Abstract Accession No. 92–431469/52, SU 1710898 A1 (Izhorsk Wks Prodn Assoc) Feb., 1992.

* cited by examiner

Primary Examiner—Thomas R. Hannon
(74) Attorney, Agent, or Firm—Geoffrey A. Mantooth

(57) ABSTRACT

A guide to support a shaft such as a pump pull rod (11) which is capable of both rotary and reciprocal motion. The guide prevents any misalignment of rod (11) damaging a seal, e.g. a stuffing box, held in space (24). Guide element (18) has central portion (19) and annular flange (25). Element (18) can move laterally with respect to housing (12) and can also pivot, along with the cap (15) of the housing (12), with respect to the lower portion (14) thereof. The latter is achieved via movements of part-spherical bearing element (28) and similarly shaped faces (26, 37, 38) of housing 9120. Further seals (33, 34) prevents entry of pumped fluid into chamber (13).

15 Claims, 1 Drawing Sheet

SELF-ALIGNING SHAFT SUPPORT

FIELD OF THE INVENTION

This invention relates to a support assembly to be used in association with a sealing arrangement to support a member which is movable with respect to a base element. In particular, this invention relates to a support assembly used to support the pull rod of a pump assembly adjacent the seal for the pull rod.

REFERENCE TO RELATED PATENT

This invention is an improvement of the support assembly described in our earlier Australian patent 674209, the content of which is incorporated herein by reference.

BACKGROUND TO THE INVENTION

The problem of providing an adequate seal for members which are movable with respect to a base, such as rotating shafts or reciprocating pull rods, is well known. This problem is made worse when the rotating or reciprocating member is caused to undergo relative lateral or angular displacement with respect to the housing in the region of the seal.

Generally, most parts of the support arrangement are machined and it is often difficult to provide an adequate seal. Further, if the rotating or reciprocating member has been misaligned or is bent, a portion of the shaft can be caused to "orbit" around its central axis during the rotation cycle. This misalignment can occur where the drive means for the member is out of alignment with the central axis of the member or where due to a fault in the drive means the pump rod is caused to be flexed out of alignment during each stroke of the drive means.

In the past a variety of support arrangements have been proposed for accommodating for lateral or angular displacement of a movable member with respect to a housing, however these arrangements have not proved to be satisfactory where the movable member may be subjected to heavy tensional loads as in the case where a pump pull rod or high differential fluid pressure acts on the support assembly or seal.

An example of a support arrangement is disclosed in Australian patent specification 625322 which discloses a guide for a movable shaft which accommodates for lateral and angular displacement of a pump pull rod with respect to a housing. It has been found, however, that while this arrangement has in many cases proved to be satisfactory where that assembly has been subjected to high load as a result of fluid pressure within the wellhead, high point loadings have been established between the bearing member and the bearing rings of the assembly which has limited the freedom of movement between the bearing member and the housing.

Our earlier Australian patent 674209 describes a self-aligning shaft support incorporating a pair of spherical bearing members that allow both lateral and angular movement of the pull rod. However, it allows the fluid being pumped into the bearing chamber. The abrasive nature of that fluid may cause speedy failure of the bearings and/or the associated seals.

It is an object of this invention to provide an improved self-aligning shaft support which allows both relative lateral and angular displacement of the shaft under high pressure conditions.

SUMMARY OF THE INVENTION

The invention accordingly provides a guide for supporting a first member in a housing where said first member is capable of rotational and reciprocal movement relative to the housing; said guide including a bearing housing having a first angled face, said bearing housing supporting a guide element, said guide element including a central member having an axial passage therethrough which is adapted to sealingly receive the first member to permit said rotational and reciprocal movement, said guide member further including a substantially annular flange element which is received within the bearing housing adjacent the first angled face thereof, said guide member being supported from the first angled face by an annular bearing element, located between one axial face of the flange element and the first angled face of the bearing housing, wherein said bearing housing includes a base having said first angled face and a cap that cooperates with the guide member, said cap including a lower angled face cooperable with a second angled face provided on said base, and wherein the first angled face of the bearing housing and an angled face of the bearing element with which the first angled face is cooperable are of a substantially spherical configuration to enable angular displacement of the guide member relative to said base, and said second and lower angled faces are of substantially spherical configuration to enable angular displacement of the cap relative to the base.

More preferably, said first angled face and said second and lower angled faces have substantially the same radius of curvature.

Preferably, said cap includes a detachable lower portion which extends inwardly towards said axial passage, said lower portion including said lower angled face.

Preferably, said base includes an outwardly extending flange portion, said flange portion including said second angled face.

Preferably the centre of curvature of each spherical face is located on the central axis of the central member.

Preferably, the bearing housing includes a second axial face, substantially opposed to the first axial face. More preferably, said second axial face includes a bearing, wherein said bearing facilitates relative movement between another axial face of the flange element and the second axial face of the bearing housing. Preferably, the second axial face of the bearing housing is substantially perpendicular to the central axis of the central member.

BRIEF DESCRIPTION OF THE DRAWING

The invention will be now be described, by way of an illustrative example, with reference to the accompanying drawing (FIG. 1) which shows a vertical cross-sectional view of a support arrangement according to an embodiment of the invention.

DESCRIPTION OF PREFERRED EMBODIMENTS

Figure 1:
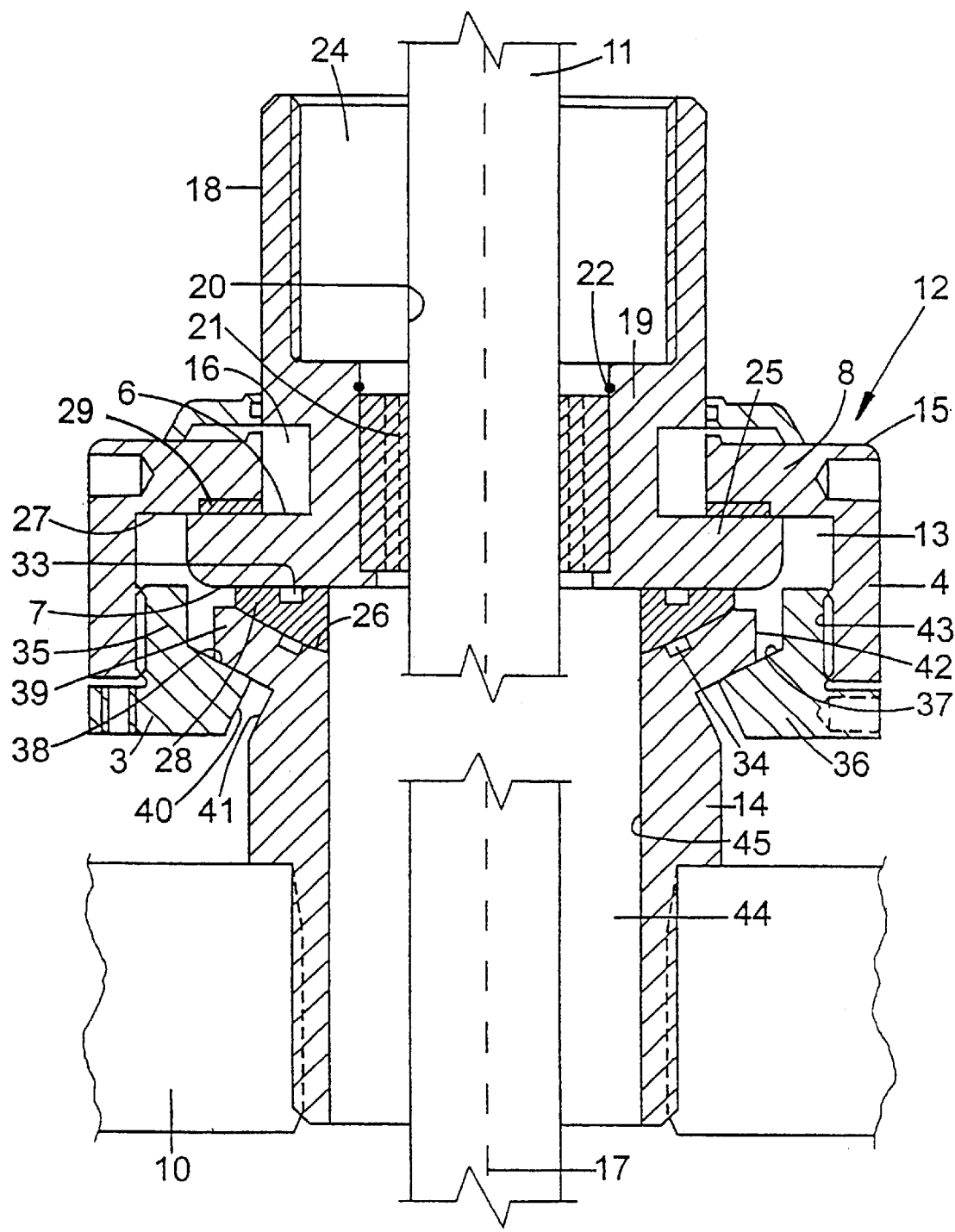

The accompanying drawing illustrates a support arrangement for supporting a pump pull rod 11 which is to be supported from a housing 10. The support arrangement has particular application where the pull rod 11 is likely, during its working life, to become misaligned with the central axis of the bore hole. In the past it has been found that the forces which are created by misalignment of the pull rod 11 can be particularly destructive to the sealing arrangement provided on housing 12.

The support arrangement includes a bearing housing 12 which defines a bearing chamber 13. The bearing housing 12 includes a substantially tubular base 14 and a cap member 15 which is movingly supported upon the base 14. Chamber 13 is defined between the outermost end of the base member 14 and the interior of the cap member 15. Base member 14 is adapted to be supported at its innermost end from the housing 10. Cap member 15 includes an upper end 8, a side wall 4 integral with end 8, and a lower portion 3.

The support assembly further includes a guide member 18 which includes substantially tubular central element 19 including a bore 20 the diameter of which corresponds substantially with the diameter of the pull rod 11. The bore 20 has a central axis 17. The central element 19 of the guide member 18 is located above the base 14 and has a central bearing 21 which slidably supports the pull rod 11 and a seal 22. The outermost end of the central member 19 has an open space 24 which may be used to accommodate a seal, stuffing box, or the like, which may take any form which is desired to slidably and sealingly accommodate the pull rod 11.

The guide member 18 further includes an annular flange element 25. Flange element 25 is received within the bearing chamber 13 between the base 14 and the upper end 8 of the cap 15, where the base 14 provides an angular face 26. The inner upper face 27 of the end 8 of cap member 15 is substantially perpendicular to central axis 17 and includes bearing 29. Bearing 29 facilitates relative movement between axial face 6 of the flange element 25 and inner upper face 27. The axial faces 6, 7 of the flange element 25 are substantially parallel to each other and are perpendicular to the central axis 17 of the central member 19. The flange element 25 of the guide member 18 is supported on angled face 26 by a bearing element 28 between the lowermost axial faces of the flange element 25 and axial face 26. A seal 34 is provided between the angled face 26 and bearing 28, and a seal 33 is provided between bearing 28 and face 5.

The lower portion 3 is securely yet removably attached to side wall 4; and has an upper portion 35 which extends axially into chamber 13, and a lower body portion 36 which has an upper, curved face 37. Face 37 mates with and is moveable relative to face 38 of flange 39. Face 26 is also on flange 39 and is generally parallel to face 38. Faces 37, 38 and 26 are preferably curved, with the radius of curvature of each being substantially the same.

In this way, the cap 15, and thus the guide member 18 and shaft 11, can move in an arcuate manner about face 38. The limits of movement are defined by the contact of face 40 by face 41 on either side of base 14; and face 42 on face 43 on flange 39.

Bearing 28 is preferably attached to face 7 so that it moves with guide member 18 relative to base 14.

For radial movement (in a plane perpendicular to axis 17) guide member 18 and thus shaft 11 can move relative to cap 15 and base 14 as upper end 8 of cap 15 can be accommodated in a circumferential recess 16 in guide member 18, immediately above flange 25. The limits of movement can be defined by upper end 8 contacting guide member 18 at the end of recess 16 and/or flange 25 contacting side wall 4. The limit of movement should be such that shaft 11 cannot contact the side wall 45 of bore 44 of base 14.

To facilitate lubrication of the bearing surfaces of the support assembly between the flange element and the bearing element and between the bearing element and the axial face of the bearing chamber, the bearing chamber may be filled with a lubricant with seals 33, 34 preventing the fluid being pumped from entering chamber 13.

It will be appreciated that the support assembly of the invention provides a means to allow a rotating or reciprocating member to undergo relative lateral or angular displacement, while at least minimising damage to sealing members, thereby maintaining an adequate seal.

It will be understood that the invention disclosed and defined in this specification extends to all alternative combinations of two or more of the individual features mentioned or evident from the text or drawings. All of these different combinations constitute various alternative aspects of the invention.

What is claimed is:

1. A guide for supporting a first member in a housing where said first member is capable of rotational and reciprocal movement relative to the housing; said guide including a bearing housing having a first angled face, said bearing housing supporting a guide element, said guide element including a central member having an axial passage therethrough which is adapted to sealingly receive the first member to permit said rotational and reciprocal movement, said guide member further including a substantially annular flange element which is received within the bearing housing adjacent the first angled face thereof, said guide member being supported from the first angled face by an annular bearing element, located between one axial face of the flange element and the first angled face of the bearing housing, wherein said bearing housing includes a base having said first angled face and a cap that cooperates with the guide member, said cap including a lower angled face cooperable with a second angled face provided on said base, and wherein the first angled face of the bearing housing and an angled face of the bearing element with which the first angled face is cooperable are of a substantially spherical configuration to enable angular displacement of the guide member relative to said base, and said second and lower angled faces are of substantially spherical configuration to enable angular displacement of the cap relative to the base.

2. A guide as claimed in claim 1, wherein said first angled face and said second and lower angled faces have substantially the same radius of curvature.

3. A guide as claimed in claim 1, wherein said cap includes a detachable lower portion which extends inwardly towards said axial passage, said lower portion including said lower angled face.

4. A guide as claimed in claim 1, wherein said base includes an outwardly extending flange portion, said flange portion including said second angled face.

5. A guide as claimed in claim 4, wherein said cap includes a detachable lower portion which extends inwardly towards said axial passage, said lower portion including said lower angled face.

6. A guide as claimed in claim 4, wherein said base includes an outwardly extending flange portion, said flange portion including said second angled face.

7. A guide as claimed in claim 1, wherein the centre of curvature of each spherical face is located on the central axis of the central member.

8. A guide as claimed in claim 1, wherein the bearing housing includes a second axial face, substantially opposed to the first axial face.

9. A guide as claimed in claim 8, wherein the second axial face of the bearing housing is substantially perpendicular to the central axis of the central member.

10. A guide as claimed in claim 8, wherein said second axial face includes a bearing, wherein said bearing facilitates relative movement between another axial face of the flange element and the second axial face of the bearing housing.

11. A guide as claimed in claim 10, wherein said facilitated relative movement includes movement transverse to the central axis of the central member.

12. A guide as claimed in claim 11, further including means to limit said transverse movement such that said first member cannot contact the interior side wall of said bearing housing.

13. A guide as claimed in claim 8, wherein said second axial face is provided on said cap.

14. A guide as claimed in claim 13 wherein said second axial face and said other face of the flange element are substantially perpendicular to the central axis of the central member.

15. A guide as claimed in claim 13, wherein said cap is accommodated in a circumferential recess in said guide element adjacent said flange element.

* * * * *